United States Patent
Nilsen et al.

(10) Patent No.: US 6,877,866 B2
(45) Date of Patent: *Apr. 12, 2005

(54) MULTI-ORIENTATION RETROREFLECTIVE STRUCTURE

(75) Inventors: Robert B. Nilsen, Weatoque, CT (US); Xiao Jing Lu, Yorktown Heights, NY (US); Gary J. Gauer, South Windsor, CT (US)

(73) Assignee: Reflexite Corporation, Avon, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/223,812

(22) Filed: Aug. 19, 2002

(65) Prior Publication Data

US 2002/0196542 A1 Dec. 26, 2002

Related U.S. Application Data

(63) Continuation of application No. 09/491,912, filed on Jan. 27, 2000, now Pat. No. 6,457,835, which is a continuation of application No. 08/980,707, filed on Dec. 1, 1997, now Pat. No. 6,036,322.

(51) Int. Cl.$^7$ .............................................. G02B 5/122
(52) U.S. Cl. ..................................... 359/530; 359/529
(58) Field of Search ................................ 359/529–530; 428/156, 161, 167, 172

(56) References Cited

U.S. PATENT DOCUMENTS

| | | |
|---|---|---|
| 835,648 A | 11/1906 | Straubel |
| 1,591,572 A | 7/1926 | Stimson |
| 2,022,639 A | 11/1935 | Stimson |
| 2,055,298 A | 9/1936 | Leray |
| 2,161,842 A | 6/1939 | Allison, Sr. |
| 2,310,790 A | 2/1943 | Jungersen |
| 2,380,447 A | 7/1945 | Jungersen |
| 2,538,638 A | 1/1951 | Wilson |
| 2,911,682 A | 11/1959 | Ewald |
| 3,258,840 A | 7/1966 | Hedgewick et al. |

(Continued)

FOREIGN PATENT DOCUMENTS

| | | |
|---|---|---|
| CA | 785139 | 5/1968 |
| DE | 42 40 680 A | 6/1994 |

(Continued)

OTHER PUBLICATIONS

Meeting notes from the CEN TC226/WG3 ad hoc group on sign performance at the Hans Busch Institute, Technical University of Darmstadt, Germany, on Feb. 9–10, 1993.

(Continued)

Primary Examiner—James Phan
(74) Attorney, Agent, or Firm—Hamilton, Brook, Smith & Reynolds, P.C.

(57) ABSTRACT

A retroreflective structure is disclosed that has cube corner retroreflective elements. The structure includes a first array of retroreflective elements oriented in a first direction within a plane and a second array of retroreflective elements oriented in a second direction within the plane, wherein said second direction being about 90° to said first direction. The structure further includes a third array of retroreflective elements oriented in a third direction within the plane, wherein said third direction being about 180° to said first direction and a fourth array of retroreflective elements oriented in a fourth direction being about 270° to said first direction. In one embodiment, the retroreflective structure includes the retroreflective elements having cube corner elements having a pitch between elements in the range of between about 0.0035 and 0.0045 inches (0.088 and 0.114 millimeters). In a preferred embodiment, the retroreflective structure includes a metalized layer on the facet side of the retroreflective elements for specular reflection, and the retroreflective elements are tilted by about −3 degrees.

7 Claims, 9 Drawing Sheets

U.S. PATENT DOCUMENTS

| | | |
|---|---|---|
| 3,399,477 A | 9/1968 | Johnson et al. |
| 3,450,459 A | 6/1969 | Haggerty |
| 3,469,898 A | 9/1969 | Altman |
| 3,541,606 A | 11/1970 | Heenan et al. |
| 3,684,348 A | 8/1972 | Rowland |
| 3,689,346 A | 9/1972 | Rowland ............... 156/245 |
| 3,712,706 A | 1/1973 | Stamm .................. 359/530 |
| 3,810,804 A | 5/1974 | Rowland |
| 3,811,983 A | 5/1974 | Rowland |
| 3,830,682 A | 8/1974 | Rowland |
| 3,833,285 A | 9/1974 | Heenan |
| 3,873,184 A | 3/1975 | Heenan |
| 3,887,268 A | 6/1975 | Golden et al. |
| 3,893,747 A | 7/1975 | Nagel |
| 3,923,378 A | 12/1975 | Heenan |
| 3,924,929 A | 12/1975 | Holmen et al. |
| 3,924,958 A | 12/1975 | Rowland |
| 3,935,359 A | 1/1976 | Rowland |
| 3,975,083 A | 8/1976 | Rowland |
| 3,992,080 A | 11/1976 | Rowland |
| 4,025,159 A | 5/1977 | McGrath |
| RE29,396 E | 9/1977 | Heenan |
| 4,066,331 A | 1/1978 | Lindner |
| 4,182,548 A | 1/1980 | Searight et al. |
| 4,202,600 A | 5/1980 | Burke et al. |
| 4,243,618 A | 1/1981 | Van Arnam ............... 264/1 |
| 4,244,683 A | 1/1981 | Rowland |
| 4,297,051 A | 10/1981 | Robinson |
| 4,332,847 A | 6/1982 | Rowland |
| 4,349,598 A | 9/1982 | White |
| 4,460,449 A | 7/1984 | Montalbano |
| 4,478,769 A | 10/1984 | Pricone et al. |
| 4,519,675 A | 5/1985 | Bar-Yonah |
| 4,533,592 A | 8/1985 | Bingham |
| 4,555,161 A | 11/1985 | Rowland |
| 4,576,850 A | 3/1986 | Martens |
| 4,582,885 A | 4/1986 | Barber |
| 4,588,258 A | 5/1986 | Hoopman |
| 4,618,518 A | 10/1986 | Pricone et al. |
| 4,633,567 A | 1/1987 | Montalbano |
| 4,668,558 A | 5/1987 | Barber |
| 4,775,219 A | 10/1988 | Appeldorn et al. |
| 4,801,193 A | 1/1989 | Martin |
| 4,875,798 A | 10/1989 | May |
| 4,895,428 A | 1/1990 | Nelson et al. |
| 4,938,563 A | 7/1990 | Nelson et al. |
| 5,022,739 A | 6/1991 | Bennett et al. |
| 5,069,577 A | 12/1991 | Murphy |
| 5,115,343 A | 5/1992 | Bennett |
| 5,117,304 A | 5/1992 | Huang et al. ............... 359/529 |
| 5,122,902 A | 6/1992 | Benson |
| 5,128,787 A | 7/1992 | Blonder .................. 359/70 |
| 5,138,488 A | 8/1992 | Szczech ............... 359/530 |
| 5,171,624 A | 12/1992 | Walter |
| 5,175,645 A | 12/1992 | Bennett et al. |
| 5,189,553 A | 2/1993 | Smith |
| 5,200,851 A | 4/1993 | Coderre et al. |
| 5,234,740 A | 8/1993 | Reeves et al. |
| 5,264,063 A | 11/1993 | Martin |
| 5,450,235 A | 9/1995 | Smith et al. ............... 359/529 |
| 5,467,208 A | 11/1995 | Kokawa et al. ............ 359/49 |
| 5,491,586 A | 2/1996 | Phillips |
| 5,508,084 A | 4/1996 | Reeves et al. |
| 5,557,836 A | 9/1996 | Smith et al. ............ 29/527.4 |
| 5,558,740 A | 9/1996 | Bernard et al. |
| 5,565,151 A | 10/1996 | Nilsen |
| 5,596,429 A | 1/1997 | Kokawa et al. ............... 349/67 |
| 5,637,173 A | 6/1997 | Martin et al. |
| 5,642,222 A | 6/1997 | Phillips |
| 5,648,145 A | 7/1997 | Martin |
| 5,706,132 A * | 1/1998 | Nestegard et al. ........... 359/529 |
| 5,822,121 A | 10/1998 | Smith et al. |
| 5,898,523 A | 4/1999 | Smith et al. |
| 5,926,314 A | 7/1999 | Smith et al. |
| 5,936,770 A | 8/1999 | Nestegard et al. ........... 359/530 |
| 6,015,214 A | 1/2000 | Heenan et al. |

FOREIGN PATENT DOCUMENTS

| | | |
|---|---|---|
| EP | 0 137 736 A2 | 4/1985 |
| EP | 0 390 344 A | 10/1990 |
| EP | 0 555 847 A2 | 8/1993 |
| EP | 0 724 737 B1 | 7/1998 |
| EP | 0 875 008 B1 | 11/1998 |
| FR | 748 391 A | 6/1933 |
| FR | 795 186 a | 3/1936 |
| FR | 2 386 059 A | 10/1978 |
| WO | WO 92/04647 A | 2/1992 |
| WO | WO 93/04858 | 3/1993 |
| WO | WO 95/11464 | 4/1995 |
| WO | WO 95/11465 | 4/1995 |
| WO | WO 95/11466 | 4/1995 |
| WO | WO 95/11471 | 4/1995 |
| WO | WO 96/10148 | 4/1996 |
| WO | WO 96 10197 A | 4/1996 |
| WO | WO 96 30786 A | 10/1996 |
| WO | WO 96/42023 | 12/1996 |
| WO | WO 96/42025 | 12/1996 |
| WO | WO 97/26567 | 7/1997 |
| WO | WO 97/28468 | 8/1997 |
| WO | WO 98/11471 | 3/1998 |

OTHER PUBLICATIONS

Sorensen, Kai, "Microprismatic Sheetings for Road Signs," DELTA Light & Optics, Mar. 1994.

Finster, Schmidt–Clausen, "Optimum Identification of Trucks for Real Traffic Situations, Report on Research Project 1.9103 of the Federal Highways Agency," Apr. 1992.

Notice of Opposition to European Patent EP 0 875 008 B1, date of mention of the grant in the European Patent Bulletin (Art. 97(4), 99(1)EPC) Jul. 31, 2002, from Dr. Carsten Rocke, dated Apr. 30, 2003.

Notice of Opposition to European Patent EP 0 875 008 B1, date of mention of the grant in the European Patent Bulletin (Art. 97(4), 99(1)EPC) Jul. 31, 2002, from Christopher Furlong, dated Apr. 30, 2003.

Notice of Opposition to European Patent EP 0 875 008 B1, date of mention of the grant in the European Patent Bulletin (Art. 97(4), 99(1)EPC) Jul. 31, 2002, from F. A. Brandl, dated Apr. 30, 2003.

Schumann, J., et al. "Brightness of Colored Retroreflective Materials" The University of Michigan Transportation Research Institute, Report No. UMTRI–96–33, Nov., 1996.

Venable, W.H. and Hale, W.N., "Color and Nighttime Pedestrian Safety Markings" Color Research and Application 21(4): 305–309, Aug., 1996.

Brochure and information regarding Stimsonite Metalized Retroreflective Sheeting sold in the United States prior to 1993.

* cited by examiner

- ■ .14 mm (5.5 mils)
- ♦ .127 mm (5.0 mils)
- ▲ .114 mm (4.5 mils)
- △ .101 mm (4.0 mils)
- ▼ .089 mm (3.5 mils)
- ● .076 mm (3.0 mils)
- × .063 mm (2.5 mils)

MULTI-ORIENTATION RETROREFLECTIVE STRUCTURE

RELATED APPLICATIONS

This application is a Continuation of U.S. Application No. 09/491,912, filed Jan. 27, 2000 (now U.S. Pat. No. 6,457,835), which is a Continuation of U.S. application Ser. No. 08/980,707, filed Dec. 1, 1997 (now U.S. Pat. No. 6,036,322), the entire teachings of which are incorporated herein by reference.

BACKGROUND OF THE INVENTION

Retroreflective sheeting has the ability to redirect light incident upon a major surface of the sheeting toward its originating source. This unique ability has led to the widespread use of retroreflective sheeting in a wide variety of conspicuity enhancement applications relating to traffic and personal safety marking. Typical examples of uses of retroreflective sheeting include the placement of such sheetings on road signs, traffic cones and barricades to enhance their conspicuity, particularly under poor lighting conditions, such as night-time driving conditions or in conditions of inclement weather. These uses typically allow the sheeting to be adhered to relatively flat and rigid surfaces, thereby allowing the sheeting to be relatively inflexible. Additionally, sign applications are characterized by relatively predictable, standardized viewing geometries.

There are essentially two types of retroreflective sheeting, beaded sheeting and cube corner sheeting. Beaded sheeting employs a multitude of independent glass or ceramic microspheres to retroreflect incident light. From the optics perspective, beaded sheeting typically exhibits favorable rotational symmetry and entrance angularity performance because of the symmetrical nature of the beads. Additionally, beaded sheeting typically exhibits relatively good flexibility because the beads are independent from one another. However, beaded sheeting tends to exhibit relatively low brightness when compared to cube corner sheeting.

Cube corner retroreflective sheeting typically employs an array of rigid, interconnected cube corner elements to retroreflect light incident on a major surface of the sheeting. The basic cube corner element is a generally tetrahedral structure having three mutually substantially perpendicular lateral faces which intersect at a single reference point, or apex, and a base triangle opposite the apex. The symmetry axis, or optical axis, of the cube corner element is the axis which extends through the cube apex and trisects the internal space of the cube corner element. In conventional cube corner elements which have an equilateral base triangle, the optical axis of the cube corner element is perpendicular to the plane which contains the base triangle. In operation, light incident on the base of the cube corner element is reflected from each of the three lateral faces of the element and is redirected toward the light source. Retroreflective sheeting generally incorporates a structured surface including at least one array of cube corner reflective elements to enhance the visibility of an object. When compared with beaded sheeting, cube corner retroreflective sheeting exhibits relatively greater brightness in response to light incident at relatively low entrance angles, for example, near normal light. However, cube corner retroreflective sheeting also exhibits relatively poor rotational symmetry performance at high entrance angles. In addition, cube corner retroreflective sheeting is typically stiffer than beaded sheeting because the cube corner elements are usually all interconnected.

The optics of cube corner retroreflective sheetings can be designed to exhibit optimal performance at a specific orientation. This can be accomplished by forming the cube corner elements of the retroreflective sheeting such that their optical axes are canted relative to an axis perpendicular to the base plane of the sheeting. U.S. Pat. No. 4,588,258, issued to Hoopman on May 13, 1986 ('258 Patent), the teachings of which are incorporated by reference herein, discloses retroreflective sheeting which employs optics having canted cube corner elements which form opposing matched pairs. The sheeting disclosed in the '258 Patent exhibits a primary plane of improved retroreflective performance at high entrance angles, identified as the x-plane in the '258 Patent, and a secondary plane of improved retroreflective performance at high entrance angles, identified as the y-plane in the '258 Patent. In use, it is recommended that sheeting manufactured the '258 Patent be oriented such that its principal plane of improved retroreflective performance, for example the x-plane, is coincident with an expected entrance plane. Thus, sheeting in accordance with the '258 Patent has a single preferred orientation. The '258 Patent discloses cube-corner retroreflective articles in which the optical axis of the elements in an array of prism element pairs are tilted toward one edge of the elements, when considered from the front surface of the article on which light to be retroreflected images. This tilt direction is herein defined as "positive" type tilt.

In another patent, U.S. Pat. No. 2,380,447, issued to Jungersen on Jul. 31, 1945 ('447 Patent), the teachings of which are incorporated by reference herein, discloses in FIG. 15 of the '447 Patent the optical axis of prism pairs tilting away from the common edge.

In another patent, U.S. Pat. No. 5,171,624, issued on Dec. 15, 1992 to Walter, the teachings of which are incorporated herein in its entirety by reference) discloses microprism reflective sheeting in which prism pairs are tilted with respect to one another at an angle of in the range of between about three and ten degrees, prism size of 0.15–0.64 mm (0.006–0.025 inches) (space between apices) and wherein at least one prism side surface is arcuate.

However, a need still exists for a retroreflective structure that provides a more uniform distribution of light.

SUMMARY OF THE INVENTION

The present invention is directed to a retroreflective structure having cube corner retroreflective elements. The structure includes a first array of retroreflective elements oriented in a first direction within a plane and a second array of retroreflective elements oriented in a second direction within the plane, wherein said second direction being about 90° to said first direction. The structure further includes a third array of retroreflective elements oriented in a third direction within the plane, wherein said third direction being about 180° to said first direction and a fourth array of retroreflective elements oriented in a fourth direction being about 270° to said first direction. In one embodiment, the retroreflective structure includes the retroreflective elements having cube corner elements having a pitch between elements in the range of between about 0.0035 and 0.0045 inches (0.088 and 0.114 millimeters) and a negative tilt between prism pairs. In a preferred embodiment, the retroreflective structure includes a metalized layer on the facet side of the retroreflective elements for specular reflection.

The invention has many advantages including providing a more uniform retroreflection profile than a single or double orientation cube corner prism sheeting. The invention is useful for truck conspicuity enhancement marking.

DETAILED DESCRIPTION OF THE INVENTION

Figure 1:
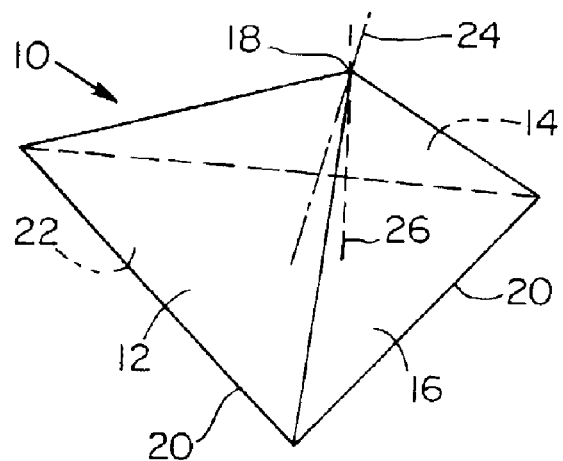
FIG. 1 shows a perspective view of a cube-corner retroreflective element in a retroreflective structure.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. It will be understood that the particular embodiments of the invention are shown by way of illustration and not as limitations of the invention.

The principal features of this invention can be employed in various embodiments without departing from the scope of the invention. All percentages and parts are by weight unless otherwise indicated.

Figure 2:
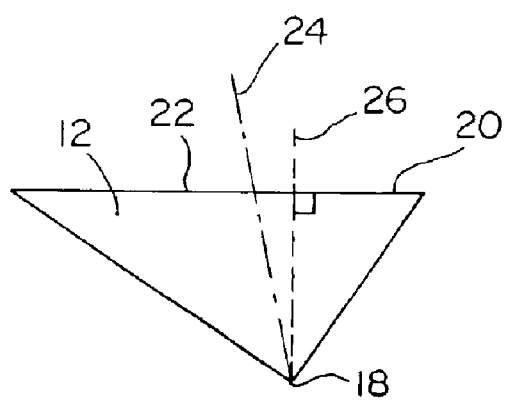
FIGS. 2, 3 and 4 show side elevational views of the lateral faces of the cube-corner retroreflective element.
Figure 3:
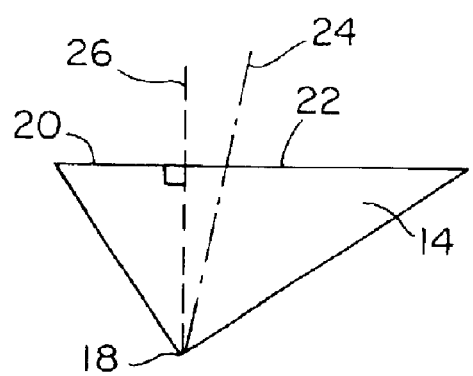
Figure 4:
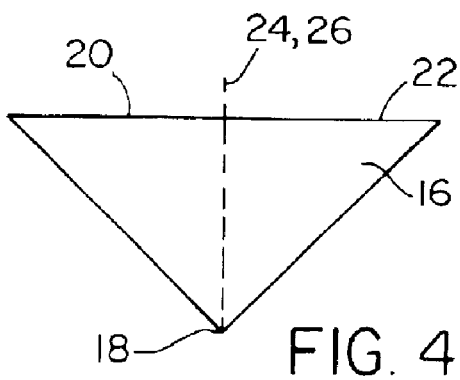

A cube-corner retroreflective element useful in a retroreflective article of the invention is shown in perspective view in FIG. 1 and in side elevation views in FIGS. 2, 3 and 4. As shown, element 10 has three mutually perpendicular lateral faces 12, 14, 16 which meet at apex 18. Base edges 20 of lateral faces 12, 14, 16 are linear and lie in a single plane, that is, base plane 22 of element 10. Element 10 also has a central or optical axis 24, which is a trisector of the internal angle defined by the lateral faces 12, 14, 16 and which is tilted with respect to a line 26 perpendicular to the base plane 22. Retroreflection occurs when light incident on the base plane 22 of the element is internally reflected by one of the three lateral faces to a second face, then to a third face, and then back through the base toward the source of light.

In retroreflective articles, a cube-corner element as shown in FIGS. 1, 2, 3 and 4 is generally used with at least one other cube-corner element as part of a matched pair, and commonly is used with an array of such elements. The other cube-corner elements, such as they might appear in an array of elements, are shown in plan view of FIG. 5 which shows the back of a representative retroreflective article 28. The elements are joined together, for example, by being formed as a part of a single integral sheet material or by being attached at base plane 22 to film 36.

Figure 5:
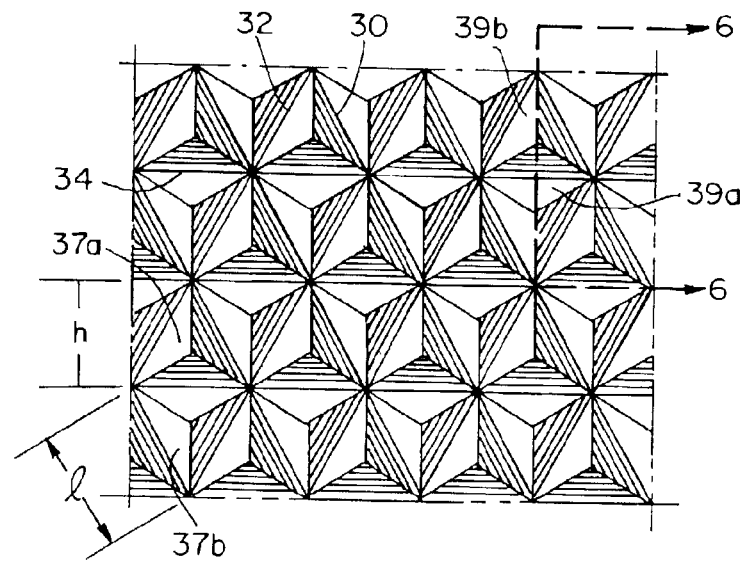
FIG. 5 shows a plan view of a retroreflective sheeting with an array of cube-corner elements as shown in FIGS. 1, 2, 3 and 4.
Figure 6:
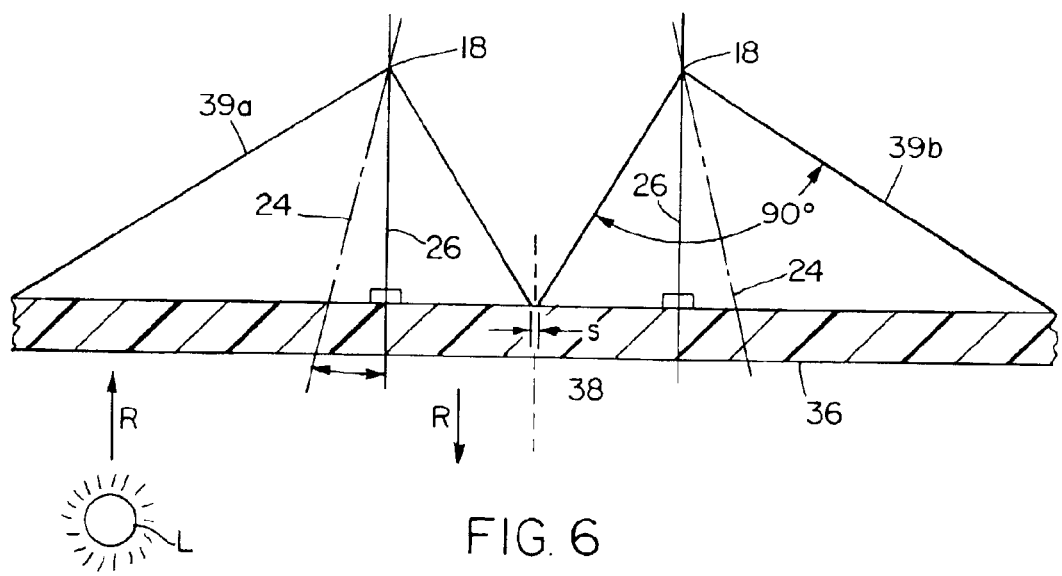
FIG. 6 shows a sectional view taken along line 6—6 of FIG. 5.

FIG. 6 shows in a section view a portion of the retroreflective article pictured in FIG. 5 and shows film 36 of a material, such as a polymeric film, connecting the elements 39a, 39b together. Because base edges 20 of retroreflective element 10 are linear and in a common plane, an array of such elements is defined by intersecting sets of grooves. Referring to FIG. 5, element 10 is defined by three V-shaped grooves 30, 32, 34 which are each one member of three sets of grooves which cross the array in an intersecting pattern to form matched pairs of prism elements. Matched pair of prisms 37a, 37b has a height (h) dimension and a length (l) dimension. In a preferred embodiment with a −3° tilt, the height dimension has a range of between about 0.0035 and 0.0045 inches (0.088 and 0.114 millimeters). In alternative embodiments, the retroreflective cube-corner elements include a height in the range of between about 0.002 and 0.02 inches. The length dimension has a range of between about 0.0032 and 0.0043 inches (0.812 and 0.109 millimeters).

As shown in FIG. 6, light ray (R) from light source (L) is incident on and passes through film 36 to retroreflective element 10 where it is internally reflected and returns through film 36. The matched pair of retroreflective elements 10 has center line 38 that is parallel with lines 26. The shown match pair has a negative tilt from center line 38 as indicated by angle α between optical axis 24 and line 26. The optical axis 24 diverges from center line 38 in the direction of light source L. Conversely, for a positive tilt matched pair, the optical axis converges with the center line in the direction toward the light source. In one embodiment, the tilt can range from about −7° to 7°. In a preferred embodiment, the tilt is about −3°. The matched prisms can have a space (s) between the prisms. In one embodiment, the space has a length of between about 0.00002 and 0.004 inches (0.0005 and 0.102 millimeters).

Generally, the prisms are made by forming a master on a flat surface of a metal plate or other suitable material. To form the cube corners, three series of parallel equidistance intersecting V-shaped grooves 60 degrees apart are inscribed in the flat plate. The female replicant die is then used to process the desired cube-corner array into a rigid flat plastic surface.

When the groove angle is 70 degrees, 31 minutes, 43.6 seconds, the angle formed by the intersection of two cube faces (the dihedral angle) is 90 degrees and the incident light is reflected back to the source. For automobile headlight reflectors, the dihedral angle is changed so that the incidental light is reflected non-orthogonally towards the driver instead of the source.

The efficiency of a retroreflective structure is a measure of the amount of incidental light returned within a cone diverging from the axis of retroreflection. Distortion of the prismatic structure adversely affects the efficiency.

Further details concerning the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346, issued to Rowland on Sep. 5, 1972, the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting. The preferred materials for forming the sheetings can be any transparent polymer film. Polycarbonate, polyester, polyvinyl chloride, polyurethane are most commonly used.

Figure 7:
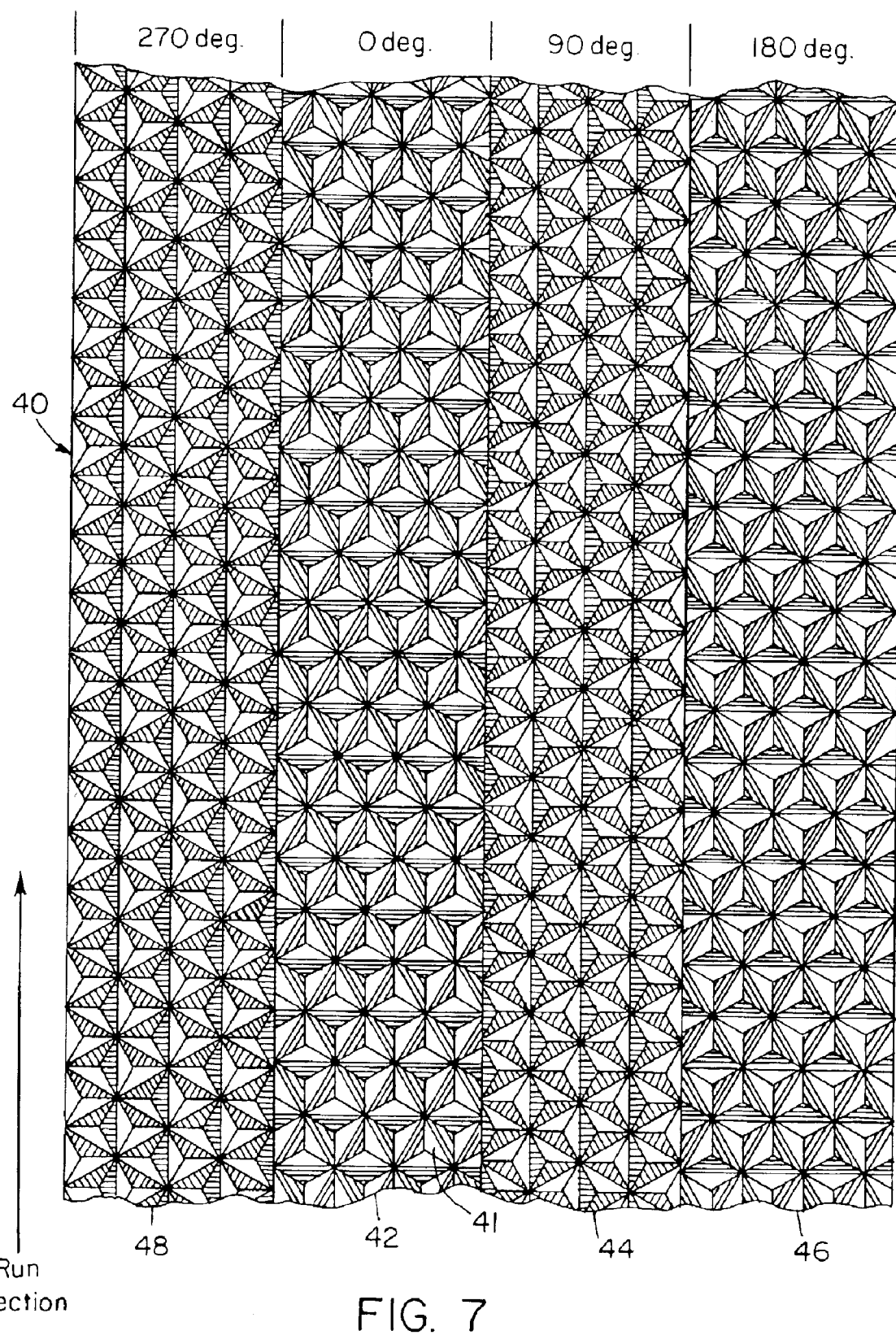
FIG. 7 shows a plan view of a retroreflective sheeting having cube corner retroreflective elements rotated about the optical axis at 0, 90, 180 and 270 degree orientations respective to the casting direction.

FIG. 7 shows a plan view of retroreflective sheeting 40 having cube corner retroreflective elements rotated about the optical axis at 0, 90, 180 and 270 degree orientations respective to a casting or run direction. Retroreflective sheeting 40 has first array 42 of retroreflective elements 41 oriented in a first direction. First array 42 can be in the form of a strip. In one embodiment, first direction is the same as the run direction, which is the direction the film is processed continuously through the manufacturing equipment, also known as the web direction. Second array 44 of retroreflective elements 41 abuts first array 42. Second array 44 has an orientation in a second direction, which is different than the first direction. In one embodiment, second direction is at 90 degrees to first direction. Third array 46 of retroreflective elements abuts second array 44. Third array 46 has an orientation in a third direction which is different than the first direction and second direction. In one embodiment, third direction is at 180 degrees to first direction. Fourth array 48 of retroreflective elements 41 abuts first array 42. Fourth array 48 has an orientation in a fourth direction which is different than the first direction, second direction and third direction. In one embodiment, fourth direction is at 270 degree to first direction.

Due to problems when forming the mold for the cube-corner retroreflective prisms, the arrays are not fully symmetrical. For example, the V-shaped grooves may be slightly different because of temperature at the time of cutting or of a change in the sharpness of the cutting blades. This non-symmetry results in a non-symmetrical pattern at 0° and 180° and at 90° and 270° and at orientation angles in between.

Two factors or specifications of corner cubes (or prismatic sheets) affect their performance mostly. One factor is the single corner cube size on a prismatic sheet, which is described in terms of the pitch of the corner cube. There can be three different pitches in three directions for a prismatic sheet. Each one of them represents a cutting spacing in the corresponding direction. For a regular prismatic material, these three directions form sixty degree angles among any two of them. Thus, one pitch is usually chosen as the main pitch to represent the corner cube size in most cases. The pitch is shown in FIG. 5 as dimension (h) for matched pair of prisms 37a, 37b. The corner cube pitch is small and ranges from about 0.001 to 0.01 inches (0.025 and 0.25 millimeters). In one embodiment, the pitch ranges from between about 0.002 and 0.006 inches (0.05 and 0.15 millimeters). In a preferred embodiment, the pitch ranges from between about 0.0035 and 0.0045 inches (0.088 and 0.114 millimeters). It generates a diffraction pattern in a far field when it is illuminated by an incoming light beam. The diffraction effect influences the performance of the prismatic sheet when measuring photometric data at specified observation and entrance angles. The observation angle is the angle between the incidence (entrance) axis and observation axis. Incidence (entrance) axis is the axis defined by the path of incident light from a light source. The observation axis is the axis defined by the path of retroreflected light from the point of incidence on an article to an observation point. The entrance angle is the angle between the reference axis, which is the line normal to the retroreflective article at the point where light is incident thereto, and the incident axis.

The second factor that affects performance is the direction of the corner cube optical axis which is described by the tilt angles. Two angles are needed to define the optical axis. One angle is defined as an angle formed between the optical axis and the main pitch direction (or machine direction of a prismatic sheet casting process) that is named the X direction. This angle is called the tilt angle. The second is defined as an angle by which a plane containing the optical axis and the actual pitch direction is rotated with respect to the X direction. In most design cases of corner cubes or prismatic materials, the second angle is selected to be zero so that it is sufficient to utilize a tilt angle to describe its optical direction. The tilt angle is usually categorized as positive and negative tilts.

Figure 8:
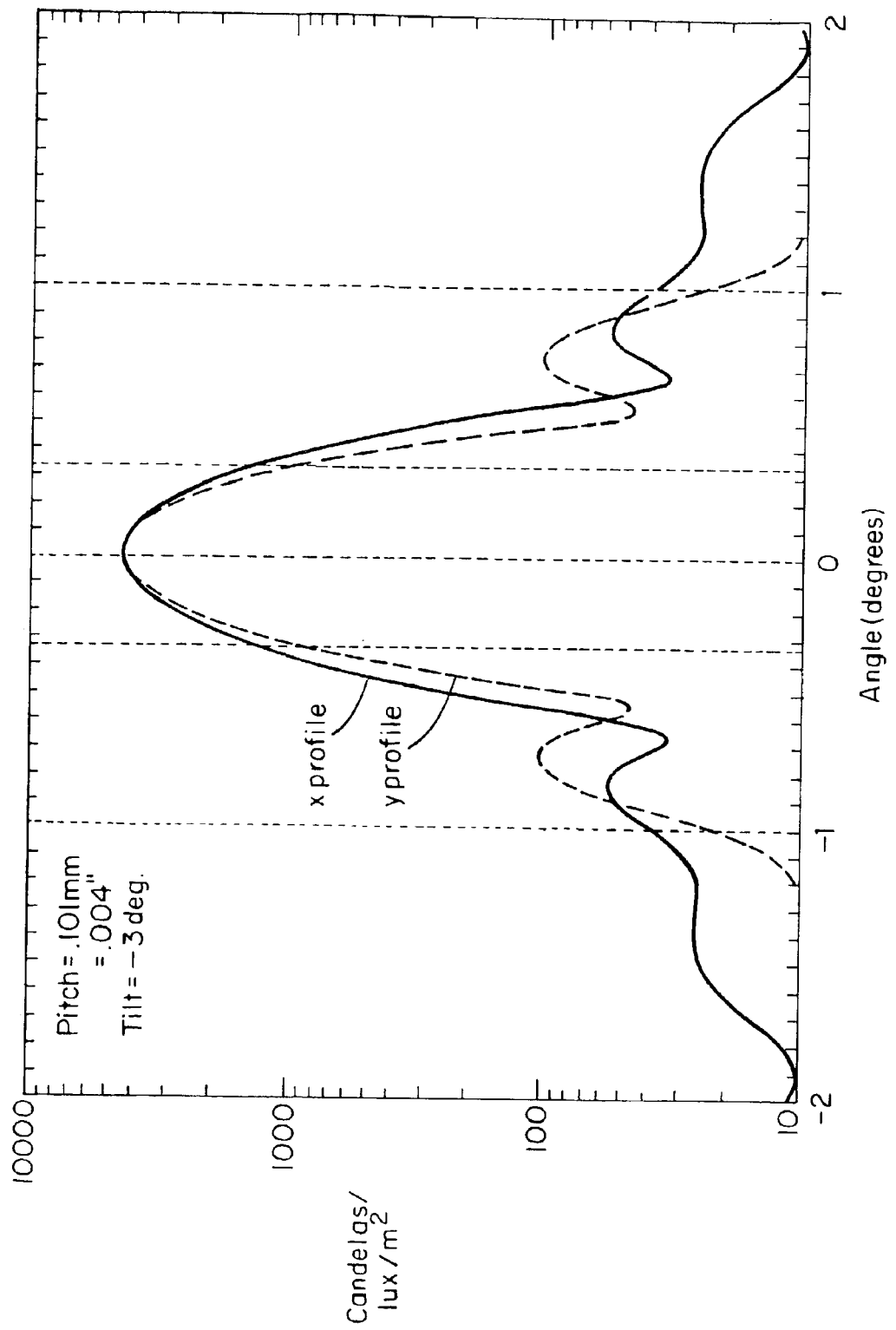
FIG. 8 shows a plot of the X and Y profiles of a diffraction pattern generated by an array of corner cubes having a pitch of 0.004 inches (0.101 millimeters) and a tilt of −3 degrees that is illuminated by a light beam with a center wavelength of 550 nm at a range of observation angles between −2 and 2 degrees.
Figure 9:
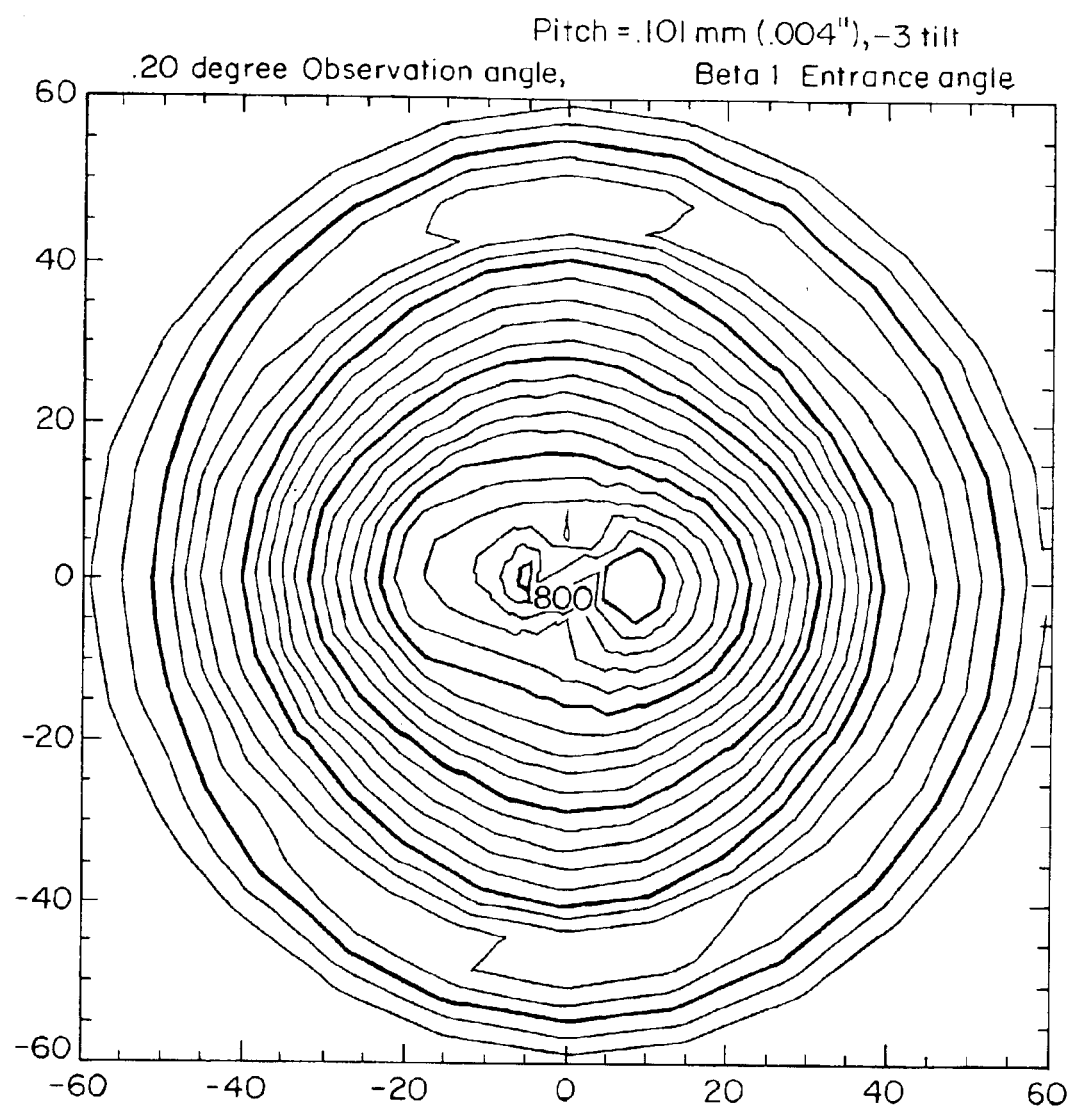
FIG. 9 shows a plot of a corresponding contour map constructed from a set of diffraction patterns, which are produced by a set of illumination angles (SIA) also known as entrance angles.

The diffraction pattern that is the returned light pattern by a prismatic material at a far field can be obtained by a photometric measurement of the prismatic material in a test step and can usually be represented by a data table and a contour map. It can also be obtained in the design step by a theoretical calculation of corner cubes with given specifications. The results can be represented as a data table similar like the measured one, a three dimensional plot, X and Y profiles, and a contour map as the same as a photometric one. FIG. 8 shows X, Y profiles and FIG. 9 shows a corresponding contour map.

An optimum of prism configuration, in combination with the multiple arrays, can be designed by calculating the diffraction patterns of corner cubes with different pitches and tilts. A corner cube design is optimized in terms of SIA at 0.33° observation angle at 0 and 90 degrees of orientation angles versus entrance angles. The two parameters in this optimization are pitch and tilt angle. Such a retroreflective structure when illuminated with a CIE Standard illuminant A and measured as recommended by CIE Publication No. 54 (1982), the teachings of which are incorporated herein by reference, and having a white sheeting with a pitch of between about 0.0035 and 0.0045 inches (0.088 and 0.114 millimeters), can have a coefficient of retroreflection of at least 450 candelas/lux/m$^2$ at an observation angle of 0.33° and entrance angles of $\beta_1$ equal to 0° and of $\beta_2$ equal to 5°. For $\beta_1$ equal to 0° and $\beta_2$ equal to 30°, the coefficient of retroreflection can be at least 200 candelas/lux/m$^2$. For $\beta_1$ equal to 0° and $\beta_2$ equal to 40°, the coefficient of retroreflection can be at least 90 candelas/lux/m². For $\beta_1$ equal to 0° and $\beta_2$ equal to 60, the coefficient of retroreflection can be at least 16 candelas/lux/m².

Similarly, for yellow sheeting, the coefficient of retroreflection at an observation angle of 0.33° and entrance angles of $\beta_1$ equal to 0° and $\beta_2$ equal to 5° is at least 300 candelas/lux/m². For $\beta_1$ equal to 0° and $\beta_2$ equal to 30°, the coefficient is at least 130 candelas/lux/m². For $\beta_1$ equal to 0° and $\beta_2$ equal to 40°, the coefficient is at least 75 candelas/lux/m². For $\beta_1$ equal to 0° and $\beta_2$ equal to 60°, the coefficient is at least 10 candelas/lux/m².

The color of the sheeting measured with a spectrophotometer in accordance with the provisions of CIE Document No. 15 (1971), the teachings of which are incorporated herein by reference, and illuminated with CIE Standard illuminant D65 at angle of 45° to the normal and viewed along the normal (45°/0° geometry) the color of the material is located in a region defined by the chromaticity coordinates and comply with the luminance factor β. For the color white, the chromaticity coordinates are coordinate 1, x=0.300, y=0.270; coordinate 2, x=0.385, y=0.355; coordinate 3, x=0.345, y=0.395; and coordinate 4, x=0.260, y=0.310. The luminance factor is greater than or equal to 0.25. For the color yellow, the chromaticity coordinates are coordinate 1, x=0.545, y=0.454; coordinate 2, x=0.487, y=0.423; coordinate 3, x=0.427, y=0.483; and coordinate 4, x=0.465, y=0.534. The luminance factor is greater than or equal to 0.16.

Alternatively, the color can be measured by the CIE Standard illuminant A at entrance angle $\beta_1=\beta_2=0°$, or if this produces colorless surface reflection, angle $\beta_1=0°$ and $\beta_2=+5°$, and is measured at an observation angle of α=0.33°. For the color white, the chromaticity coordinates are coordinate 1, x=0.373, y=0.402; coordinate 2, x=0.417, y=0.359; coordinate 3, x=0.450, y=0.513; and coordinate 4, x=0.548, y=0.414. For the color yellow, the chromaticity coordinates are coordinate 1, x=0.585, y=0.385; coordinate 2, x=0.610, y=0.390; coordinate 3, x=0.520, y=0.480; and coordinate 4, x=0.505, y=0.465.

Figure 10:
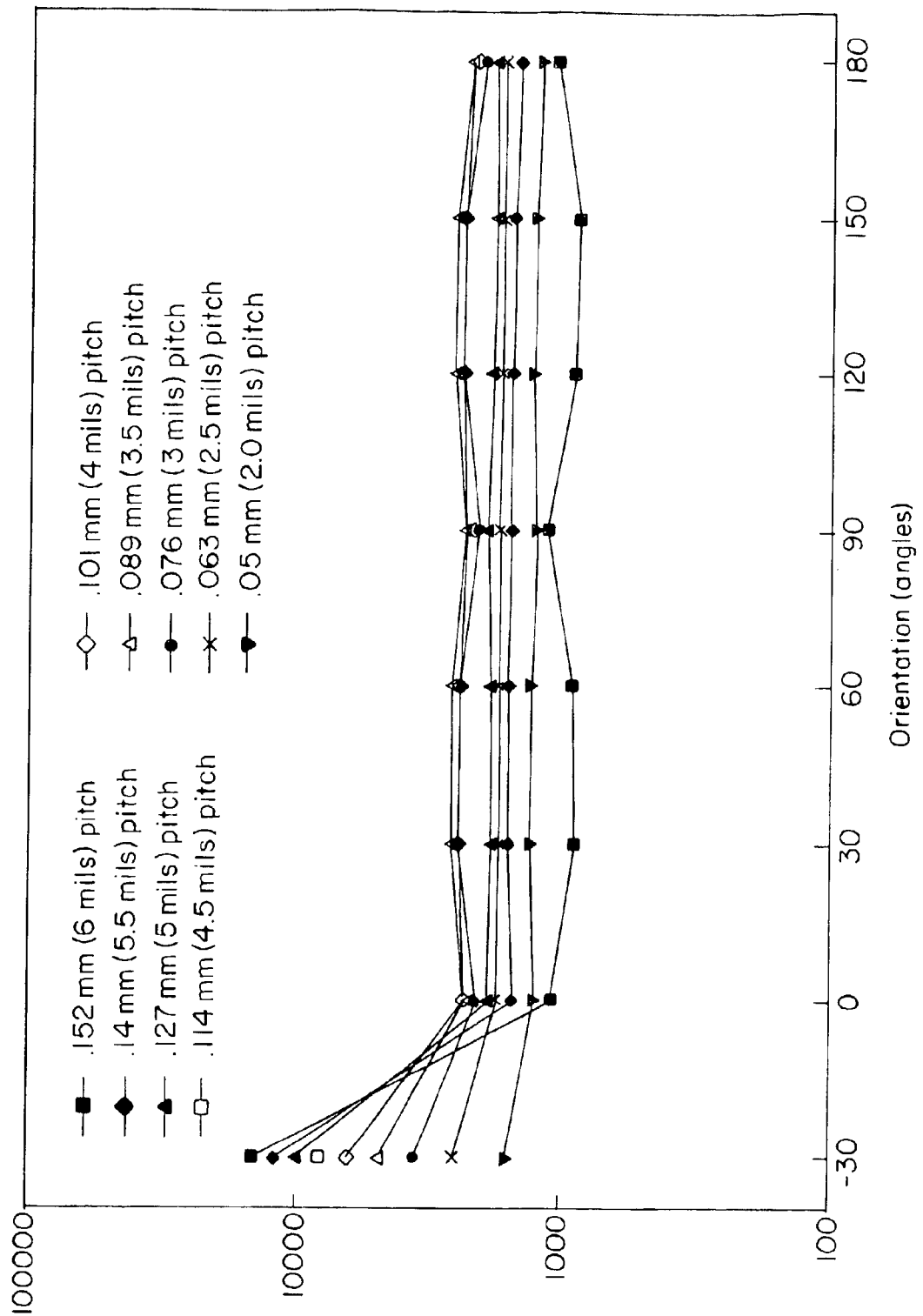
FIG. 10 shows a plot of SIA's at 0 and 0.33 degrees versus orientation angles for cube corner arrays having pitches of 2, 2.5, 3, 3.5, 4, 4.5, 5, 5.5 and 6 mils (0.05, 0.063, 0.076, 0.089, 0.101, 0.114, 0.127, 0.14 and 0.152 millimeters).

FIG. 10 shows a set of curves, which are the functions of SIA at 0 and SIA at 0.33 observation angles versus orientation angles from 0 to 180 degrees while the entrance angle is 5 degrees ($\beta_1=+5$ and $\beta_2=0$). The parameter of the curves is the corner cube pitch at 0.002, 0.0025, 0.003, 0.0035, 0.004, 0.0045, 0.005, 0.0055 and 0.006 inches (0.05, 0.063, 0.076, 0.089, 0.101, 0.114, 0.127, 0.14 and 0.152 millimeters). The theoretical calculation allows one to obtain the SIA at 0 degree, or the center value of the diffraction pattern of corner cubes. As can be seen, a small range from 0.0035 to 0.0045 inches (0.088 and 0.114 millimeters) produces much better performance (a flatter but higher profile over angles −30 to 180 degrees) at 0.33 degree observation angle.

The optimized design for a cube corner retroreflector specifically about the 0.33 degree observation angle appears to be approximately 0.0037 inches (0.094 millimeters) in length by 0.0035 inches (0.089 millimeters) in height pitch at a tilt of approximately −3 degrees. This is preferably designed for a metalized products. These dimensions characterize the specifics of the cube corner designs which show an improved photometric performance at the 0.33 degree observation angle along with increased performance at entrance angles.

The performance is not uniform at the orientation angles. The typical application is at 0 degrees and 90 degrees respective to the run direction of the material. These geometries can also be extended to 180 and 270 degrees, respectively.

In order to provide a more uniform sheeting, retroreflective structure utilizes strips or arrays of prisms at these specific orientations. The arrays are oriented such that a smoothing action occurs yielding premium performance at each of these geometries. Although two orientations provide an improvement over one orientation, to eliminate or smooth any manufacturing errors, the four orientations provide the preferred effect.

The parquet of arrays can be formed by a number of methods with differing level of accuracies dependent upon method utilized. In one embodiment, an electroform or a casting mold can be machined into pieces, then reassembled to the desired arrangement of cubes. Other practices include mastering of individual pieces or arrays of individual pieces. In one embodiment, the arrays have a width of between about 0.25 and 0.5 inches (6.35 and 12.7 millimeters). Preferably, the width is about 0.33 inches (8.38 millimeters). The parqueting technique can run either perpendicular or parallel to the run direction of the sheeting. Any angle in between can be utilized to provide substantially the same effect.

The sheeting is preferably coated with a specular reflective coating on the prism facets to enhance retroreflective performance and to aid in manufacture of a thin product. The coatings can be aluminum, silver, gold or similar which aid in similar desired properties.

The spacing (s) in between the cubes on one or more edges, as shown in FIG. 6, is for the purpose of enhancing specular reflection of the sheeting. The space can be either flat or of a specific optical shape. The improvement in the luminance factor can be substantial. To enhance the specular reflection from this surface even further, the surface can be etched, lapped, abraded, bead blasted, laser written, compression molded, or any other type of material removal or deforming process which creates a non-uniform surface. A buffed flat surface can double the luminance value of an aluminum metalized part with only a ten percent loss in retroreflected brightness values. The buffing adds textures to the flat surface. The spacing can be created in the mastering process or in subsequent processes from the lifts of the master.

Figure 11:
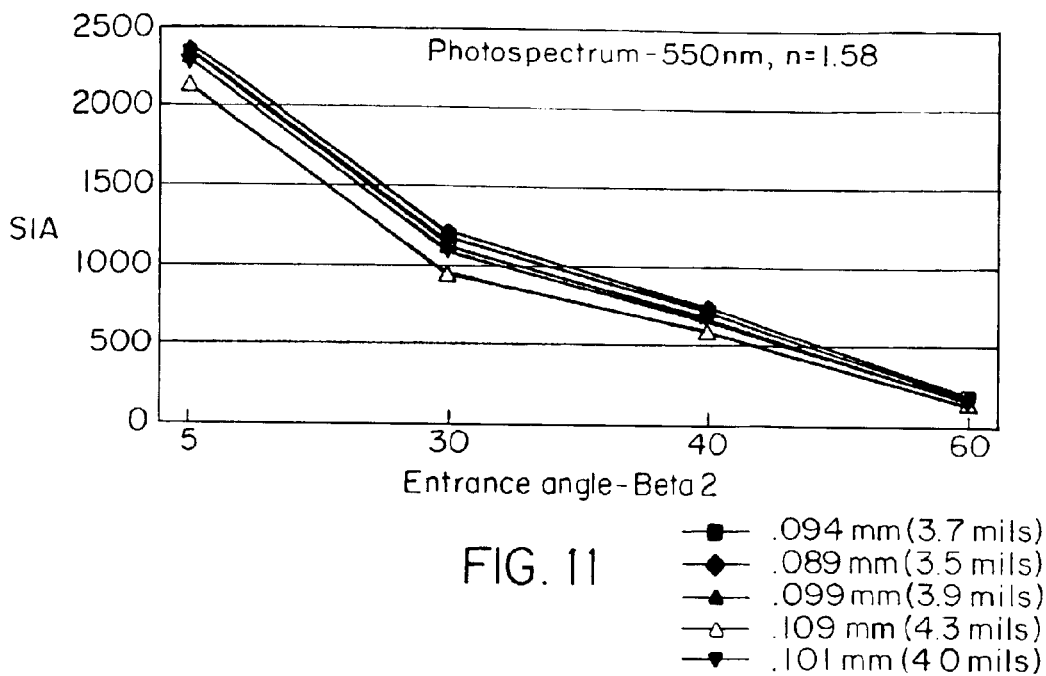
FIG. 11 shows a plot of curves that represents SIA's at 0.33 degrees in 0° direction versus beta 2 entrance angles, for corner cube arrays having pitches of 3.5, 3.7, 3.9, 4.0 and 4.3 mils (0.089, 0.094, 0.099, 0.101 and 0.109 millimeters).
Figure 12:
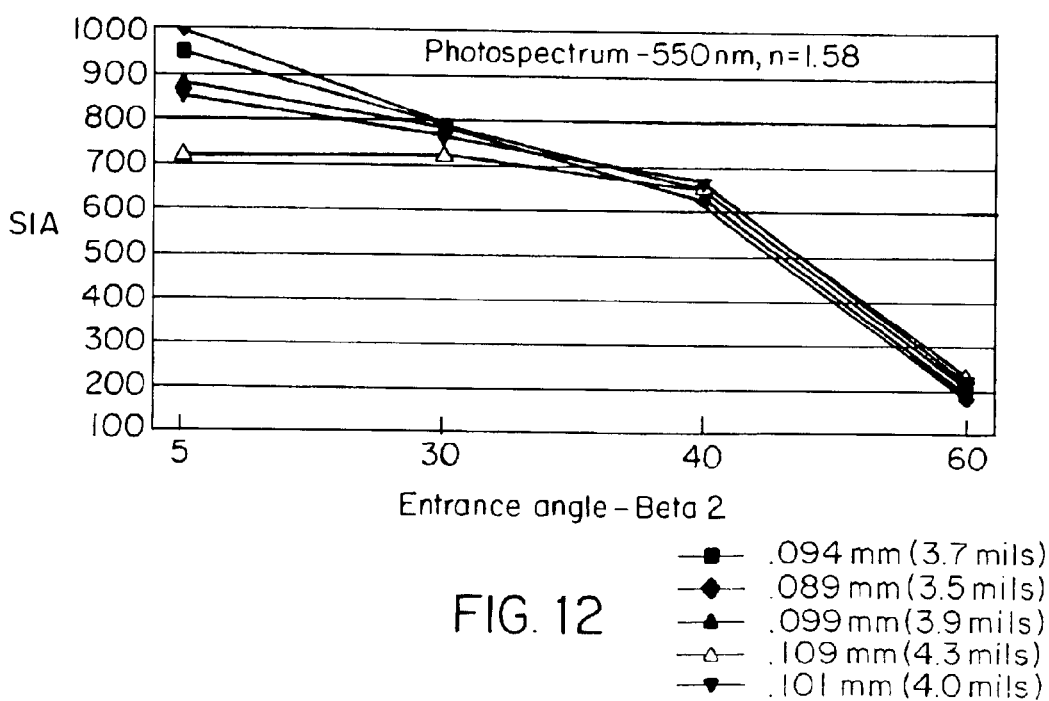
FIG. 12 shows a plot of curves that represents SIA's at 0.33 degrees in 90° direction versus beta 2 entrance angles for corner cube arrays having pitches of 3.5, 3.7, 3.9, 4.0 and 4.3 mils (0.089, 0.094, 0.099. 0.101 and 0.109 millimeters).

FIGS. 11 and 12 represent two sets of curves, which are the functions of SIA at 0.33 observation angles versus entrance angles at beta 2 direction from 5 to 60 degrees. The set of curves shown in FIG. 11 is for a zero degree orientation angle and the curves in FIG. 12 are ninety degrees. The pitches for the comparison are chosen to cover a range from 0.0035 to 0.0043 inches (0.89 and 0.109 millimeters). In these two figures, a −3 degrees tilt is selected for all pitches.

Figure 13:
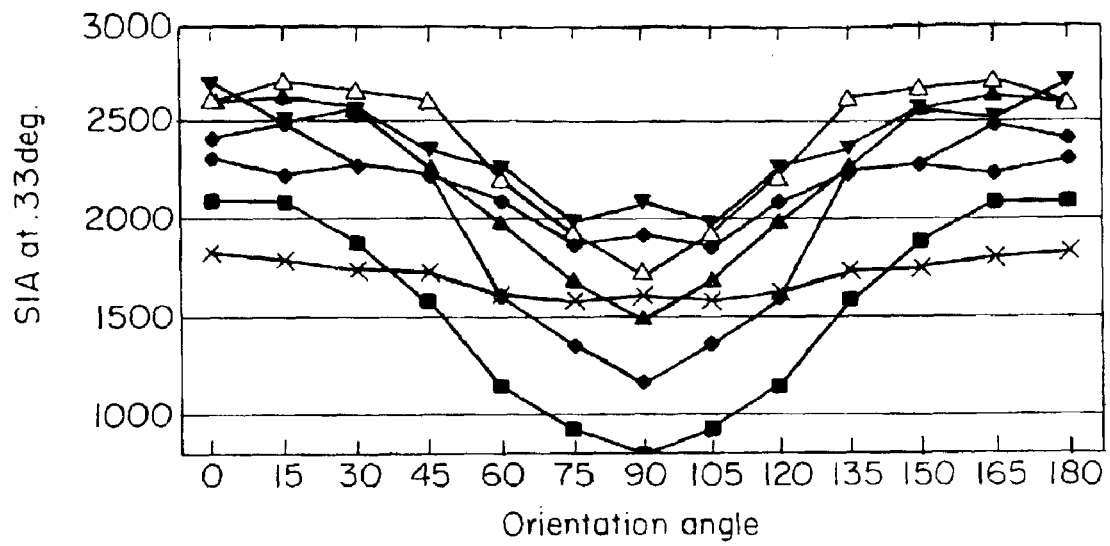
FIG. 13 shows a plot of curves that represents SIA's at 0.33 degrees as a function of orientation angles for cube corner arrays having pitches of 2.5, 3, 3.5, 4, 4.5, 5 and 5.5 mils (0.063, 0.076, 0.089, 0.101, 0.114, 0.127 and 0.14 millimeters).

A comparison of the SIA's at 0.33 degree at all orientation angles for pitches 0.0025, 0.003, 0.0035, 0.004, 0.0045, 0.005 and 0.0055 inches (0.063, 0.076, 0.089, 0.101, 0.114, 0.127 and 0.14 millimeters) is shown in FIG. 13. FIG. 13 shows that the pitches from 0.0035 to 0.004 inches (0.088 to 0.101 millimeters) can produce a much better performance among the range 0.0025-0.0055 inches (0.063-0.14 millimeters). The 0.0035 and 0.004 inch (0.088 and 0.101) prisms provide a greater average and flatter retroreflectivity profile over a 360° orientation angle.

Figure 14:
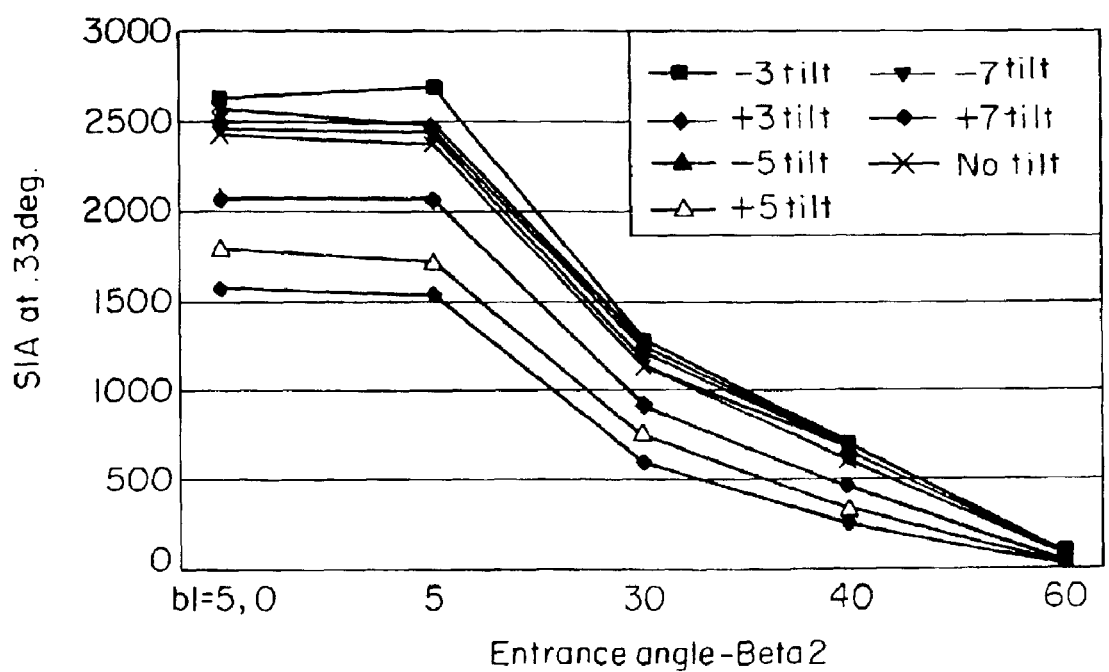
FIG. 14 shows a plot of curves that represents SIA's at 0.33 degrees in 0° direction versus beta 2 entrance angles for corner cube arrays with tilt angles of −7, −5, −3, 0, 3, 5 and 7 degrees having pitches of 0.0035 inches (0.089 millimeters).
Figure 15:
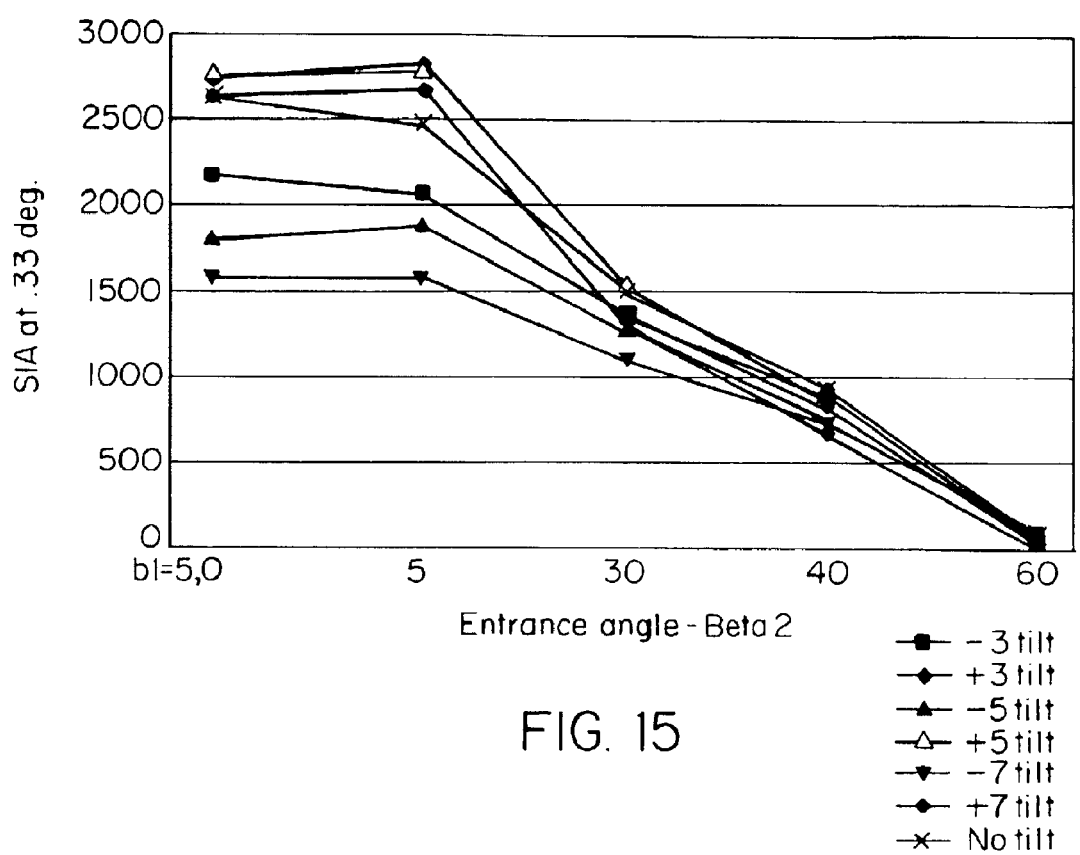
FIG. 15 shows a plot of curves that represents SIA's at 0.33 degrees in the 90° direction versus beta 2 entrance angles for corner cube arrays with tilt angles of −7, −5, −3, 0, 3, 5 and 7 degrees having pitches of 0.0035 inches (0.089 millimeters).

Two sets of curves in FIGS. 14 and 15 disclose the variations of SIA at 0.33 observation angle as the entrance angle changes from 5 to 60 degrees at beta 2 direction for a representative pitch size of 0.0035 inches (0.089 millimeters). The tilt angles in the range −7 degrees to 7 degrees are used as parameters to compare the SIA's at 0.33 degrees. Negative tilts give higher SIA in the first group of curves, which are at 0 degree orientation angle. Minus 3 degree tilt produces the highest SIA's. The second group shown in FIG. 15 at a 90 degree orientation angle provides higher SIA on positive tilts. Three and five degree tilts provide the favorable performances along the beta 2 direction.

Equivalents

While this invention has been particularly shown and described with references to preferred embodiments thereof, it will be understood by those skilled in the art that various changes in form and details may be made therein without departing from the spirit and scope of the invention as described by the appended claims.

What is claimed is:

1. A retroreflective structure comprising arrays of retroreflective cube-corner elements having a pitch between elements in the range of between about 0.0025 and 0.0055 inches, a first array of retroreflective cube-corner elements being oriented in a first direction within a plane, a second array of retroreflective cube-corner elements being oriented in a second direction being about 90° to said first direction, a third array of retroreflective cube-corner elements oriented in a third direction within the plane, wherein said third direction being about 180° to said first direction, and a fourth array of retroreflective cube-corner elements oriented in a fourth direction being about 270° to said first direction, each array extending the length of one side of the retroreflective structure, wherein said cube-corner elements are tilted at about −3°.

2. The retroreflective structure of claim 1 wherein the retroreflective cube-corner elements include a metalized layer on the facet side of the elements.

3. The retroreflective structure of claim 1 wherein the first direction is a casting direction.

4. The retroreflective structure of claim 1 wherein the retroreflective cube-corner elements include a height in the range of between about 0.002 and 0.02 inches.

5. A retroreflective structure comprising four arrays of retroreflective cube-corner elements, each array having a pitch between elements in the range of between about 0.0025 and 0.0055 inches and being oriented at about 90° relative to one another in a plane, the cube-corner elements of the first array being oriented in a run direction, each array extending the length of the retroreflective structure, wherein said cube-corner elements are negatively tilted.

6. The retroreflective structure of claim 5, wherein the cube-corner elements are tilted at about −3°.

7. A retroreflective structure comprising arrays of retroreflective cube-corner elements having a pitch between elements in the range of between about 0.0025 and 0.0055 inches, a first array of retroreflective cube-corner elements being oriented in a plane at about 90° relative to a second array of retroreflective cube-corner elements, a third array of retroreflective cube-corner elements oriented in a third direction within the plane, wherein said third direction being about 180° to said first direction, and a fourth array of retroreflective cube-corner elements oriented in a fourth direction being about 270° to said first direction, each array extending across the length of the retroreflective structure, wherein matched pairs of cube-corner elements are tilted in a negative direction.

* * * * *